Oct. 8, 1940.  E. W. DODGE  2,216,939
ROTARY GAS AND OIL SEPARATOR
Filed Feb. 18, 1939  3 Sheets-Sheet 1
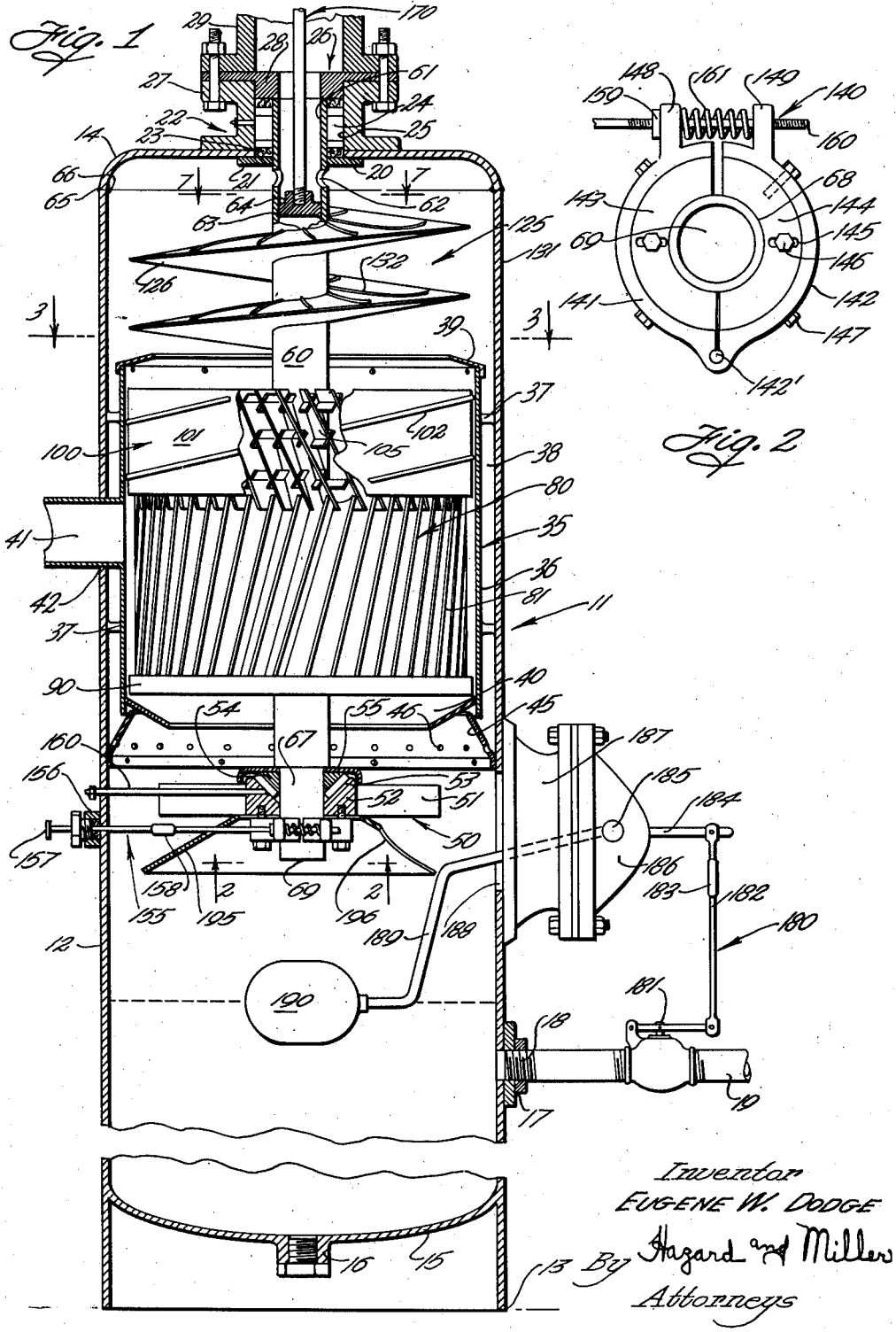
Inventor
EUGENE W. DODGE
By Hazard and Miller
Attorneys Oct. 8, 1940. E. W. DODGE 2,216,939
ROTARY GAS AND OIL SEPARATOR
Filed Feb. 18, 1939 3 Sheets-Sheet 2
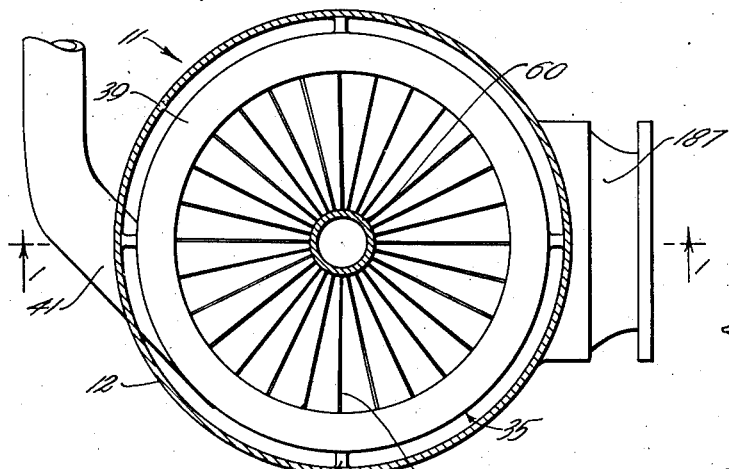
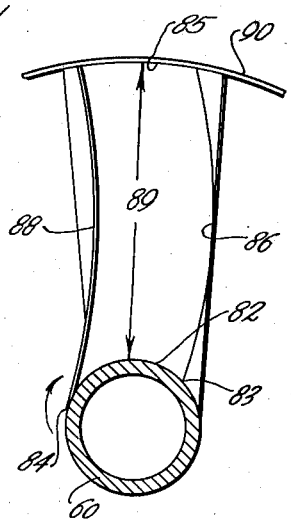
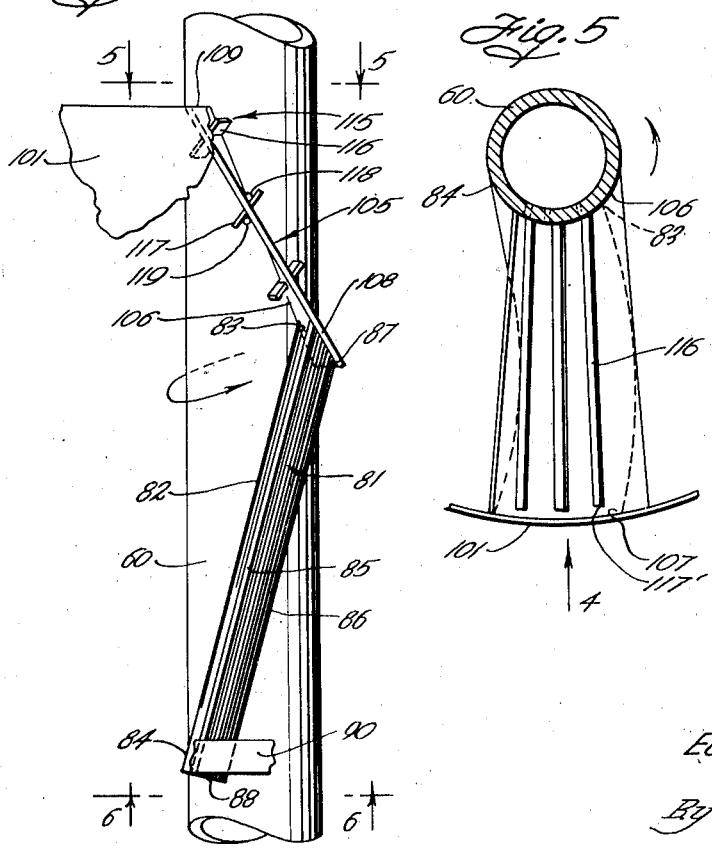
Inventor
EUGENE W. DODGE
By Hazard and Miller
Attorneys Oct. 8, 1940.  E. W. DODGE  2,216,939
ROTARY GAS AND OIL SEPARATOR
Filed Feb. 18, 1939  3 Sheets-Sheet 3
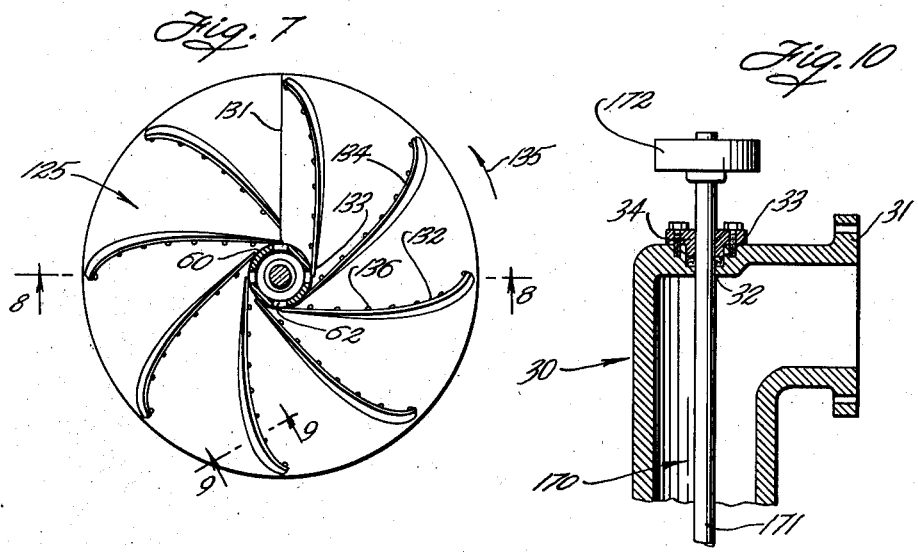
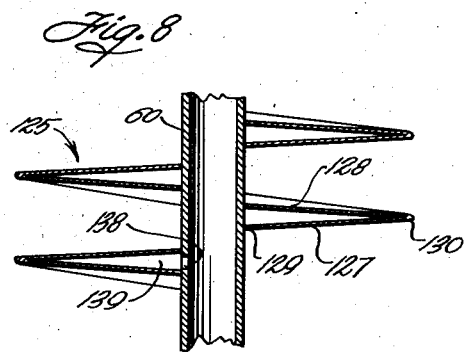
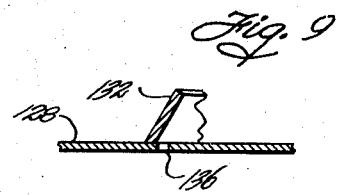
Inventor
EUGENE W. DODGE
By Hazard and Miller
Attorneys

UNITED STATES PATENT OFFICE 2,216,939

ROTARY GAS AND OIL SEPARATOR

Eugene W. Dodge, Shafter, Calif.

Application February 18, 1939, Serial No. 257,068

9 Claims. (Cl. 183—2.7)

My invention relates to a separator for gas and oil as this is derived substantially directly from an oil well and in which my invention pertains particularly to a rotary type of separator.

One of the problems and difficulties encountered in the flow of oil from an oil well or gas from a so-called gas well involves the separation of the gas from the oil. Even in wells in which the proportion of oil is very large compared with the gas there is practically always a certain content of gas which becomes liberated at the reduced pressure of atmosphere or approximating such pressure at the top of the well. Such gas and oil must be separated. In the so-called gas wells in which the main portion of the flow from the well is a gas there is practically always a certain oil content carried by the gas which must be separated therefrom. Manifestly there are both pumped and flowing wells in which the proportion of oil to gas varies through a considerable range for which many types of separating apparatus including scrubbers have been used to obtain the separation.

A main object and feature of my invention is a rotary gas and oil separator and a method of separating in which the flow of the gas and oil from the well drives or operates in rotation a rotary type of separator. This separator has an initial action of extracting the oil which is of greater specific gravity than the gas from the mixture by a centrifugal action, a large portion of the oil being thrown outwardly by a centrifugal force developed on the rotor which is driven by the incoming flow of gas and oil. This oil is discharged onto a suitable surface and drips downwardly into a receiving tank or receptacle. As the gas is lighter than the oil, it has a natural upward flow.

However the upwardly flowing gas contains in nearly all cases oil which must be separated from the gas. In the first procedure my invention incorporates and contemplates a series of gas actuated impellers which give additional force in operating the rotor in its rotation and also such impellers are operative to the continuous upward motion of the gas. An initial scrubbing action on the gas is produced by a series of baffles attached to the vanes of the gas impeller which function to collect the oil in the gas, thus reducing the oil content considerably below that of the entrance of oil into the gas portion of the rotor. In this gas portion of the rotor the gas and the oil are prevented from flowing outwardly by centrifugal action, the baffles or fins connected with and mounted on the vanes of the gas rotor form channels for the flow of the oil.

Another characteristic of my invention as it relates to the gas actuated impeller resides in having the fins connected to the vanes slightly shorter than such vanes, the vanes being connected at their outer edge to the cylindrical shell of this gas impeller but the fins being slightly shorter so that some of the oil trapped by the fins is thrown outwardly by centrifugal action against the spinning shell and flows downwardly mixing with the oil thrown outwardly by the oil actuated impeller blades. The hollow shaft also is provided with perforations so that some of the oil enters into such hollow shaft and flows downwardly.

In the operation of my separator, due to the gas expanding in its upward flow through the gas actuated impeller and in the upper part of the housing or casing there is a differential gas pressure in the lower part of the casing immediately above the deflected oil and the upper part of the casing, the pressure at the lower portion being lower, therefore causing a positive suction action on the inflow of oil to the hollow shaft and thence downwardly to the bottom. Some of the gas is likewise conducted downwardly but this again escapes at the bottom of the shaft and develops an upward flow.

Another important feature and characteristic of my invention is a rotary scrubber mounted on the hollow vertical shaft above the gas driven impeller. This is made in the form of a relatively thin hollow helix having a diametrical spread from the surface of the hollow shaft to slightly under the diameter of the casing. On this hollow helix I provide scrubber ribs which are tangential to the hollow shaft and curved at their outer portions in the direction of travel therefore operating somewhat as scoops. Along each rib there are a series of perforations leading to the hollow helix and also the hollow shaft has perforations at the inner end of each rib and also from the hollow space of the helix. The helix may be arranged either to aid the upward flow of the gas, that is, having an upward threading action on the flow of the gas or be opposed thereto, depending upon the type of oil and gas mixture of the well. The oil trapped by the scrubbers and inside of the helix flows into the hollow shaft and downwardly to the reservoir at the bottom of the housing. The hollow shaft is provided with a partition and gas outlets thereabove for the discharge of the accumulated gas.

Another characteristic of my invention is forming the shaft for the rotor of a tube and mounting this in bearings so that the shaft is vertical and the rotor thus rotates on a vertical axis. For this purpose I provide a suitable thrust bearing at the bottom of the hollow shaft and suitable steadying journals at the top. The rotor may thus spin quite freely, rotating the vertical tubular shaft.

Another feature of my invention is a control device or regulator with the speed of rotation of the rotor. Due to the fact that oil containing gas or gas containing a large proportion of oil may enter the rotor through a large range of pressures and velocities, it is necessary to control the speed of the rotor. This is done by a manually actuated brake operating on the hollow rotor shaft. Should the rotor turn at too high a speed it might be difficult to balance if the oil were not always evenly distributed on account of the centrifugal reaction. Also the velocity of rotation of the rotor should be such that the oil is not broken up into a fine mist which might be carried upwardly with the current of gas and hence discharged with the gas flow.

A further characteristic of my invention involves a power drive from the rotor and due to the fact that the gas and oil entering the separator usually at a high pressure and high velocity, considerable power may be developed having the impeller blades actuated by the oil and the impeller vanes actuated by the gas function in the manner of turbine blades. The power take-off is preferably by a shaft which may be connected to the partition in the hollow shaft and extend upwardly through suitable stuffing boxes for a power take-off means on the exterior of the construction. This power may be utilized to drive various equipment used in connection with the oil and gas treatment, an important characteristic however being that it may operate with its load principally as a brake and thereby relieve the manually actuated brake operating in the housing from excess braking resistance. A further detailed feature of my invention is a float valve control for the discharge of oil as it accumulates, the pivoted float being mounted on a large hand hole cover construction by which access may be had to the interior parts of the gas and oil separator or in large sizes this may be sufficiently large to form a man-hole.

My invention is illustrated in connection with the accompanying drawings, in which:

Fig. 1 is a vertical section through the gas and oil separator and may be considered as taken on the section line 1—1 of Fig. 3 in the direction of the arrows as to the casing, the housing for the rotor and other associated parts, the rotor being shown in elevation partly broken away and the scrubber in elevation with certain other parts in broken sections.

Fig. 2 is a bottom view taken in the direction of the arrows 2 of Fig. 1 illustrating in particular a bottom view of the brake to control the speed of the rotor.

Fig. 3 is a horizontal section on the line 3—3 of Fig. 1 in the direction of the arrows partly broken away.

Fig. 4 is an elevation taken in the direction of the arrow 4 of Fig. 5 illustrating a simple impeller unit including the bucket for the impeller action of the oil and a vane for the impeller action of the gas. For sake of clarity this figure omits the circular series of the impeller structures.

Fig. 5 is a horizontal section on the line 5—5 of Fig. 4 in the direction of the arrows illustrating only one of the impeller units and showing particularly the gas impeller vanes with the fins.

Fig. 6 is a horizontal section on the line 6—6 of Fig. 4 in the direction of the arrows illustrating particularly a single impeller bucket driven by the oil.

Fig. 7 is a horizontal section on the line 7—7 of Fig. 1 in the direction of the arrows presenting a plan of the helical scrubber.

Fig. 8 is a vertical section through the scrubber and may be considered as taken on the section line 8—8 of Fig. 7 in the direction of the arrows.

Fig. 9 is a detail section on the line 9—9 of Fig. 7 illustrating the scoop type of ribs on the hollow scrubber helix.

Fig. 10 is a section similar to Fig. 1 being a continuation of the gas discharge connection illustrating the exterior power take-off device.

In my invention I employ a suitable housing or casing structure 11. This is illustrated as having cylindrical side walls 12 with the lower edge 13 resting on a floor or similar supporting structure and having a disk-like top 14. An inverted dome shaped bottom 15 has a sand drain-out opening 16 normally closed by a plug. At one side I provide a saddle 17 forming an oil outlet 18 to which is connected an oil discharge pipe 19. The flat top 14 has a relatively large central opening 20 with a disk 21 welded inside of the flat top, such disk having an opening, a combination pipe coupling and outside ball race structure 22 has its lower flange welded to the top 14. A removable packing gasket 23 fits on the plate 21, an anti-friction roller bearing 24 with a suitable frame is located inside of the cylindrical section 25 of the combination fitting and outer race of the roller bearing. The roller bearing centers a hollow shaft hereunder described. A packing gasket 26 is fitted on the upper flange 27, this gasket having a hub 28 forming snug fit inside of the cylindrical portion 25 and confining the anti-friction bearing at its upper end. A take-off pipe 29 is bolted to the flange 27 through the gasket 26. This pipe fitting is illustrated in the form of an elbow 30, note Fig. 10 having a flange 31 to which a gas pipe may be connected. The upper end of the elbow is provided with an opening 32 and a recess 33 in which is fitted a packing and a packing gland 34 for a power shaft takeoff hereunder described.

Positioned inside the housing and rigidly connected thereto I provide a rotor casing or housing 35. This has a cylindrical side wall 36 connected to the inside of the casing wall 12 by spacer lugs 37 preferably arranged to form one or more helices and located in the annular space 38 between the outside casing 12 and the cylindrical wall 36 of the rotor casing. At the top of the rotor casing I provide an inturned flange 39. Also secured to the bottom of the rotor casing wall 36 I provide a downwardly coned deflector 40. An inflow pipe 41 for the oil and gas preferably enters the wall 12 of the housing through an opening 42 at an angle as indicated by Fig. 3 so that the direction of flow of the oil and gas is substantially tangential to the periphery of the vanes and buckets of the rotor hereunder described. Inside of the housing 11 and below the rotor housing I employ an annular splash plate 45 having a series of drain perforations 46. A lower journal and thrust bearing assembly 50 for the rotor employs a spider 51 with radial arms secured as by welding to the inside of the casing wall 12. This has a central hub 52 forming a stationary race for a roller bearing 53 which has the upper race 54 operating thereon and covered by a cover plate 55.

A pipe core or shaft 60 has its upper end 61 journaled in the anti-friction bearing 24 and this extends downwardly through coupling 22, the packing 23 and the central opening in the disk 21. The upper end terminates below the gasket 26. A series of upper perforations 62 are for the inflow of gas to this hollow shaft. A transverse closure partition 63 separates the upper and lower parts of the pipe, this plate being provided with a threaded socket 64 in which may be inserted a screw eye or the like for lifting the rotor. It is preferable to have the top 14 removable by providing a joint 65 with a weld 66 which may readily be finished in the assembly and cut when it is necessary to disassemble the equipment. The shaft 60 extends downwardly and is provided with a reduced bearing end 67 on which is mounted the inner race 54 of a thrust bearing having the stationary race 52 and the rollers 53. Below the reduced section 67 forming the bearing the hollow shaft has an outside surface 68 for application of the brakes and if desired this may have a collar attached thereto. The lower end 69 is opened for discharge of oil.

The rotor assembly 80 includes a series of impeller buckets 81 located to be acted upon by the injected oil containing gas, see Fig. 4. These also receive the full impact of the inflowing mixture no matter what degrees of mixture of oil and gas which usually is forced in under high pressure and high velocity of travel and being usually in the form of a mist or foam. The individual buckets have an inner edge 82 which conforms to a helical line extending longitudinally of the rotor pipe 60, thus the upper corner 83 is at a relatively high position and the lower corner 84 at a relatively low position on the hollow shaft. The pitch is preferably very steep. The individual buckets have their outer peripheral edge 85 each forming a segment of a cylinder of materially less diameter than the inside of the rotor casing 36 to allow sufficient space for the downward flow and drip of the oil discharged by centrifugal force as hereunder detailed. Each of the buckets may be considered as having a concave curve or bucket section indicated at 86 between the inner edge 82 and the upper edge 87 for a purpose hereunder detailed but the lower edge 88 may be at right angles to the center line of the individual bucket. By this construction the buckets have a radial measurement defined by the measurement line 89 (Fig. 6) very much greater than the radius of the shaft 60 so that each bucket provides a large area between the rotary shaft and their outer periphery for the impelling action of the incoming oil and gas. A band 90 binds the lower outer edges of the impeller buckets 81.

The upper or gas actuated part of the rotor designated 100 employs a cylindrical shell 101, the outside of which is spaced slightly from the inside of the stationary rotor housing 36, this space being sufficient to provide for an outwardly pressed helical thread 102 of which there may be one or more, the outside of the thread being quite close to the casing wall 36. A series of gas actuated impeller vanes 105, note particularly Figs. 4 and 5, have their inner edge 106 secured to and welded to the hollow shaft 60. Their outer edge 107 is secured to the shell 101 and thus such outer edges of each vane forms a portion of a cylinder. The lower end portion 108 of each vane contacts the beveled upper edge 87 of the impeller buckets 81 and is preferably welded thereto. The upper edge 109 of each vane is preferably substantially transverse to the center line of the vane and in a radial line. There are a series of fins 115 attached to each vane, these including upper fins 116 and lower fins 117 extending outwardly in a substantially radial direction from the shaft 80 terminating at 117′ spaced from the shell 101. Adjacent the connecting points of these fins, the rotor shaft 60 is provided with perforations 118 above the vanes 119 below the vanes for the inflow of oil to the hollow pipe 60, whence such oil may drip downwardly and be discharged through the lower open end 69.

A scrubber assembly 125, note particularly Figs. 1, 7, 8 and 9 has a wide helix 126 formed by a lower helically turned plate 127 and an upper helically turned plate 128, these being each welded as indicated at 129 to the hollow face 60 and having their outer edges also welded as indicated at 130. The helix is indicated as terminating at a welded edge 131 at both its lower and upper ends, the edges of the upper and lower plates being drawn together at the terminal end. The helix is provided with a plurality of ribs 132, note particularly Figs. 1, 7 and 9, the fins preferably having a slope in reference to the upper plate of the helix. They have their inner ends 133 tangential to the hollow shaft 60 and secured thereto with a concave curve as indicated at 134 on the forward side, the direction of rotation being indicated by the arrow 135 of Fig. 7. There are a series of perforations 136 adjacent the forward side of each rib and if desired there may be ribs on the lower side of the scrubber but as a rule these are not necessary. There are one or more ports 138 leading from the hollow space 139 of the helix to the hollow shaft 60 for drainage of oil. As above mentioned, the helix may be arranged either to feed the gas upwardly similar to a screw threading action or to resist the upflow of gas and in effect work the gas downwardly. The curved or scoop shape of the ribs restrains the oil collecting on the upper surface of the scrubber from being thrown outwardly by centrifugal force, causing this to flow downwardly through the perforations 136 and drain through the ports 138.

The brake assembly 140, note Figs. 1 and 2, employs two brake shoes 141 and 142 connected by a pivot bolt 142′ which bolt is secured to the underside of the hub 52 or to one of the arms of the spider 51. Confined in the shoes are two brake linings 143 and 144 having slots 145 therethrough through which extend supporting bolts 146 also threaded into the hub 52 or the spiders 51. The lining is held in place in the shoes by radial bolts 147, the shoes having the respective lugs 148 and 149, the latter being internally threaded. A brake operating shaft 155 extends through a packing 156 in the wall 12 of the casing and has a finger grip head 157. A flexible or universal joint 158 is incorporated in the rod. On the rod there is an abutment collar 159 which engages the lug 148, the end portion 160 is threaded engaging the internal threads of the lug 149 and a compression spring 161 coiled around the rod exerts an outward thrust on the lugs and hence tends to open or spread apart the brake shoes and lining thus releasing the brake from application to the brake surface 68 of the tubular shaft 60. Rotation of the finger grip head 157 thus is operative to tighten or loosen the brakes and thus regulate the rate of rotation of the rotor and hence of the scrubber.

The power take-off designated generally by the assembly numeral 170, note particularly Figs. 1 and 10, which has a shaft 171 with the lower end screw threaded in the threaded socket 64 of the closure partition 63 of the hollow shaft 60. This shaft 171 extends upwardly through the opening 32, the recess 33 and the packing and packing gland 34. In the illustration this is provided with a pulley 172 at the top by which a belt or other drive may be carried to some power mechanism driven by this power take-off. Manifestly the resistance caused by the supply of power reduces the application of the mechanical brake 140.

The outlet valve assembly 180 for the collected oil employs a valve 181 in the oil discharge pipe 19, this being operated by a link 182 having the turn-buckle 183, the link being reciprocated by a lever arm 184 connected to a rock shaft 185. This rock shaft is journalled in a hand-hole cap 186 which is mounted on the hand-hole saddle 187 secured to the wall 12 of the cylindrical housing 11, there being a large opening 188 through which passes the float operated arm 189 which has a float 190 attached thereto. In order to divert the drip of oil directly from the float, a flared skirt 195 is attached to the central hub 52 above the mechanical brake 140, such skirt having a slot 196 in which operates the arm 189.

The manner of operation and functioning of my invention as so far described is substantially as follows: Presuming the rotary gas and oil separator is operating on oil charged to a lesser or greater degree with gas which as above mentioned flows under high pressure in the form of mist or foam or if it is operating on a gas well in which the proportion of oil may be much less than that of the gas, nevertheless the fluid first reacts against the buckets 81 of the rotor assembly 80. This rotates the whole or the rotor structure, the shaft 60 being journalled as above described with a thrust bearing at the bottom on which it may spin quite freely and the upper guide bearing at the top. At the moment of impinging of the fluid on the buckets the liquid is immediately separated from the oil much in the same manner as paint is separated from the air blast in a paint spraying equipment. Thus the gas is immediately broken loose or separated from the oil which latter forms into drops of varying sizes or a film of oil. The major portion of the oil collecting on the buckets is forced outwardly over the forward surface of the buckets by the centrifugal action and discharged over the outer edge 85, impinging on the rotor casing 36 and thus flowing downwardly and being diverted inwardly by the coned deflector 40. In addition a certain amount of the oil flows downwardly in the buckets and is discharged downwardly and also outwardly by the centrifugal force at the lower edge 88 of the buckets, this again either being diverted inwardly by the deflector 40 or being discharged directly downwardly. The cover plate 55 prevents the oil entering the thrust bearing which is lubricated by a grease duct 160 which extends outwardly through the wall 12 and has a usual type of grease fitting at its outer end.

The major portion of the gas being of lesser specific gravity has a natural upward flow and this together with the circumferential reaction of the gas on the rotor 100 gives an additional driving force to the rotor as a whole and to the shaft 160. The gas impinges directly on the vanes 105 and the fin assembly 115 having the individual upper and lower fin strip 116 and 117.

These strips are spaced from the shell 101 at their outer ends and therefore a certain amount of the oil trapped by the fins is forced outwardly against the inside of the rotor shell 101 and drips downwardly. In addition due to the decreased pressure in the shaft 60, some of the oil is carried through the perforations 118 and 119 and hence drips downwardly through the pipe. In view of the fact that a certain amount of the gas may work upwardly on the outside of the shell 101 in the annular space between such shell and the rotor casing 36, this space should be made as small as possible and in addition the helical threads 102 restrict the flow of the gas and permit a more thorough separation of the oil from the gas.

Manifestly some of the gas which with the oil impinges on the buckets 81 of the rotor assembly 80 will be carried downwardly and also will be diverted outwardly by the centrifugal action. This gas therefore flows into the space below the deflector 40. Such gas flows over the top of the fixed splash plate 45, curls underneath the lower edge of the rotor casing 36 and has an upward flow in the annular space 35. As above mentioned this space has a number of spacer lugs 37 which are so arranged as to form a series of helices, thus giving the oil a circular as well as an upward travel and allowing separation of oil which drops downwardly either in the form of a film on the inside of the wall 12 or the outside of the casing 36. Such oil collects on the upper side of the splash plate 45 and drains through the perforations 46 into the lower portion or the oil receptacle in the bottom of the housing.

The scrubber 125 performs an important function in a final separation of the oil and gas and as above mentioned, this may have the wide helix 126 arranged to aid the upward movement of the gas or to retard this, depending upon whether the thread may be considered a left or right in relation to the shaft 60. The ribs 132 in sweeping through the flowing gas cause a trapping of a certain amount of the oil a good deal of which passes downwardly through the perforations 136 into the hollow space 139 between the lower and upper plates 127 and 128 of the helix. The oil trapped in the hollow space 139 drains through perforations 138 into the hollow shaft. Therefore at the top of the housing or casing there is an upward flow of relatively clean and dry gas which has its exit through the ports 62 of the hollow shaft above the partition 63. This gas flows outwardly through the pipe fitting indicated as the elbow 30. Manifestly the power shaft 170 interferes but little with the outward flow of the gas. The float control valve assembly having the valve 181 regulates the height of the oil in the housing or casing and keeps this at a substantially constant level. Any sand or sediment that collects in the bottom of the housing may be drained through the drain-out opening 16.

It is obvious and manifest that for different sized gas and oil separators the relative dimensions and relative sizes of the various elements may be materially changed. It would also be desirable in large size machines or where a more even distribution of the torque is desired to have more than one gas and oil intake such as the inflow pipe 41, however the inflow pipe should discharge the inflowing oil and gas in a tangential manner as to the rotor.

It will be seen from the above description of the gas and oil separator that my invention involves not only the apparatus but the method in which the pressure and flow of the oil mixed with the oil and gas develops a rotary motion of the mixture of oil and gas and causes a first separation of the oil by centrifugal action and then a downward dripping of the oil by gravity. Further there is an upward flow of the gas due to its lighter specific gravity and again this gas develops a centrifugal flow of the gas with the oil trapped therein and in this procedure there is a further centrifugal separation of the oil from the gas. The further upflow of the gas acts over a surface in which particles of the oil are trapped and caused to flow downwardly in a confined channel due to the differential gas pressure between the bottom and the top of the hollow pipe 60. As above mentioned the gas pressure is higher at the upper part of the casing than in the lower part immediately above the oil level, thus causing a downward movement of the trapped oil as well as possibly a small amount of the gas.

While I have described my invention as designed especially for the treatment of petroleum oils in which the oil contains varying proportions of gas or in which gas derived from a well has such a content of oil that it is desirable to separate the oil and gas, however it is to be understood that my invention includes equipment and a procedure of cleaning or extracting liquids from gases such as for instance water or moisture from air or various liquids from other types of gases in which it is desired to clean and dry either the air or the gas under treatment. In the cleaning of air by extraction of the water or moisture content, a great deal of dust, smoke or other minute solids carried by the air are extracted with the water or other liquid.

Various changes may be made in the details of construction without departing from the spirit or scope of the invention as defined by the appended claims.

I claim:

1. In a rotary gas and oil separator, the combination of a closed housing having an outlet for gas at the top, an oil receiving receptacle adjacent the bottom and an intake for a mixture of gas and oil positioned above the oil receptacle, a vertically mounted rotor assembly having impeller buckets positioned to receive the impact of intake oil and gas and to be rotated thereby, there being a space between the periphery of the buckets and the housing, the said buckets being constructed and adapted to discharge oil outwardly by centrifugal force to said spaces, a gas actuated rotor mounted on the same axis as the oil impelled rotor, such gas rotor having a cylindrical shell and a series of vanes, the vanes being positioned to receive the impact flow of gas separated from the oil and to be driven by such flow of gas, there being a space above the said vanes for the upward flow of gas.

2. A gas and oil separator comprising in combination a housing having a top with a gas outlet, the bottom portion forming an oil receptacle with an oil outlet combined with a stationary rotor casing spaced from the housing, a vertical tubular shaft mounted in and extending vertically through the said casing, an intake for flow of a mixture of oil and gas connected through the said housing into the casing, a first rotor having impeller buckets connected to the shaft, there being a space between the periphery of the buckets and the casing and below the bottom of the buckets for the discharge of oil by centrifugal force and by gravity, and there being a space above the buckets for the upward flow of gas, a second rotor having gas impelled vanes connected to the tubular shaft and a cylindrical shell attached to the peripheral edge of the said vanes, the vanes being positioned to receive the impart of gas discharged from the inflow of oil and gas and also the gas flowing upwardly from the first rotor, there being an annular space between the shell of the second rotor and the rotor casing, said rotor casing having an opening at the top for the upward flow of gas.

3. A gas and oil separator comprising in combination a housing having a top with a gas outlet, the bottom portion forming an oil receptacle with an oil outlet combined with a stationary rotor casing spaced from the housing, a vertical tubular shaft mounted in and extending vertically through the said casing, an intake for flow of a mixture of oil and gas connected through the said housing into the casing, a first rotor having impeller buckets connected to the shaft, there being a space between the periphery of the buckets and the casing and below the bottom of the buckets for the discharge of oil by centrifugal force and by gravity, and there being a space above the buckets for the upward flow of gas, a scrubber assembly including a relatively wide diameter free edged helix secured to the said shaft and positioned above the rotor in the stream of the upwardly flowing gas, the scrubber having means to separate oil and gas, and perforations in the tubular shaft to receive oil separated by the scrubber.

4. A gas and oil separator comprising in combination a housing having a top with a gas outlet, the bottom portion forming an oil receptacle with an oil outlet combined with a stationary rotor casing spaced from the housing, a vertical tubular shaft mounted in and extending vertically through the said casing, an intake for flow of a mixture of oil and gas connected through the said housing into the casing, a first rotor having impeller buckets connected to the shaft, there being a space between the periphery of the buckets and the casing and below the bottom of the buckets for the discharge of oil by centrifugal force and by gravity, and there being a space above the buckets for the upward flow of gas, the outlet for the gas including an upward pipe extension of the hollow shaft, there being a partition in the shaft with an opening thereabove forming the gas outlet means connecting through the upper end of the pipe above said partition, an upper bearing being located above the top of the housing and such housing having an opening for the upward extension of the tubular shaft.

5. In a rotary gas and oil separator, a closed housing having an oil receptacle at the bottom with an outlet for oil, an outlet for gas at the top and an intake for a mixture of oil and gas positioned above the oil receptacle, a vertical tubular shaft mounted in suitable journals, the combination of impeller means mounted on the shaft and positioned to receive the impact flow of the oil and gas mixture and thereby form a rotor rotating the impellers and the said shaft, the impellers being constructed and adapted for the separation of gas and oil and there being a space between the periphery of the impeller means and the housing for discharge of oil by centrifugal force, there being clear spaces for the downward flow of oil and the upward flow of gas, a scrubber assembly including a relatively wide diameter free edged helix constructed with upper and lower plates connected together at their peripheral edges and secured to the hollow shaft in a spaced relation thereby forming a hollow space inside of the helix, the helix having a plurality of ribs on the upper surface together with perforations leading to the hollow space of the helix, there being further perforations in the hollow shaft leading from the hollow space of the helix to such shaft, the shaft being open at the bottom whereby oil trapped by the ribs and flowing downwardly through the said hollow shaft drips to the oil receptacle.

6. In a rotary gas and oil separator, a closed housing having an oil receptacle at the bottom with an outlet for oil, an outlet for gas at the top and an intake for a mixture of oil and gas positioned above the oil receptacle, a vertical tubular shaft mounted in suitable journals, the combination of impeller means mounted on the shaft and positioned to receive the impact flow of the oil and gas mixture and thereby form a rotor rotating the impellers and the said shaft, the impellers being constructed and adapted for the separation of gas and oil and there being a space between the periphery of the impeller means and the housing for discharge of oil by centrifugal force, there being clear spaces for the downward flow of oil and the upward flow of gas, a brake assembly mounted on a fixed structure as to the housing and having an operating connection to the hollow shaft with an actuating means for the brake extending outside of the said housing whereby the speed of rotation of the shaft may be regulated.

7. In a rotary gas and oil separator, a closed housing having an outlet for gas at the top, an oil receiving receptacle adjacent the bottom and an intake for a mixture of oil and gas positioned above the oil receptacle, a vertical shaft in the housing having lower and upper bearings connected to the housing, the combination of a rotor including gas impeller vanes connected to the shaft and positioned to receive at least part of the inflow of gas and the flow of gas directed upwardly in the housing, the said vanes being inclined in reference to a vertical radial plane to direct the flow of gas upwardly, there being an open space above the rotor to accommodate an upward stream of flowing gas, there also being a space for collection of oil separated from the gas by the vanes of the rotor whereby such oil may drip to the oil receptacle, the said shaft being hollow and open at the bottom, the gas impeller vanes having a series of radial fins attached thereto, a shell secured to the peripheral edges of the vanes, the fins terminating spaced from the said shell whereby oil may collect on the inside of the shell beyond the said fins and thereby drip downwardly to the oil receptacle.

8. In a rotary gas and oil separator having a closed housing with an outlet for gas at the top, an oil receptacle adjacent the bottom with an outlet, an inlet for a mixture of oil and gas travelling at a relatively high velocity positioned above the oil receptacle, a vertical shaft journalled in the housing combined with a rotor having impeller buckets secured to such shaft and positioned to be driven by the kinetic energy of the inflowing oil and gas, the impeller buckets being constructed and adapted to carry a proportion of the oil and gas in a rotary motion after the absorption of the kinetic energy and develop a centrifugal discharge force of the oil, there being a space outside of the impeller buckets for the centrifugal discharge of the oil with a connection to the oil receptacle at the bottom of the housing, a second impeller with vanes connected to the shaft and positioned above the first impeller bucket to receive and act upon gas flowing upwardly to develop a positive upward flow of the gas and hence produce a higher relative pressure of the gas in the upper part of the housing than in the lower part, the second impeller vanes having a rotary confined structure attached thereto restraining the oil separated from the gas from outward discharge by centrifugal force, the said shaft being hollow and having ports for entry of said separated oil, the shaft having an open passage leading to the oil receptacle.

9. In a rotary gas and oil separator having a closed structure with an outlet for gas at the top, an oil receptacle adjacent the bottom with an outlet, an inlet for a mixture of oil and gas travelling at a relatively high velocity positioned above the oil receptacle, a vertical shaft journalled in the housing combined with a rotor driven by the oil and gas due to its kinetic energy and having means to separate a large proportion of the oil from the gas and to develop a positive upward movement of the gas creating a differential relatively high pressure of the gas in the upper part of the housing compared with the pressure of the gas in the lower part of the housing, a scrubber above the rotor having a hollow helical screw secured to the shaft and presenting a large surface area in contact with the gas in the upper part of the housing, the helical surfaces having openings leading to the hollow space therein and ports in the shaft leading from such hollow space for the flow of entrained oil separated from the gas by the scrubber to the said shaft.

EUGENE W. DODGE.